United States Patent
Yoshida (10) Patent No.: US 9,252,402 B2
(45) Date of Patent: Feb. 2, 2016

(54) BATTERY SYSTEM

(75) Inventor: Hiroaki Yoshida, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 169 days.

(21) Appl. No.: 13/982,482

(22) PCT Filed: Feb. 2, 2012

(86) PCT No.: PCT/JP2012/052339
§ 371 (c)(1),
(2), (4) Date: Jul. 29, 2013

(87) PCT Pub. No.: WO2012/105636
PCT Pub. Date: Aug. 9, 2012

(65) Prior Publication Data
US 2013/0307483 A1    Nov. 21, 2013

(30) Foreign Application Priority Data

Feb. 2, 2011  (JP) .................................. 2011-020938
Feb. 2, 2011  (JP) .................................. 2011-020944
Feb. 2, 2011  (JP) .................................. 2011-020947

(51) Int. Cl.
  *H02J 7/00*    (2006.01)
  *H01M 2/02*    (2006.01)
  *H01M 10/42*   (2006.01)
  *H01M 10/6551* (2014.01)

(52) U.S. Cl.
CPC ............ *H01M 2/025* (2013.01); *H01M 10/425* (2013.01); *H01M 10/5046* (2013.01); *H01M 10/6551* (2015.04); *H01M 2010/4278* (2013.01); *H01M 2200/108* (2013.01)

(58) Field of Classification Search
CPC .................... H01M 10/5006; H01M 10/5016; H01M 10/5083
USPC .......................................................... 320/127
See application file for complete search history.

(56) References Cited

U.S. PATENT DOCUMENTS

| | | | | |
|---|---|---|---|---|
| 5,362,942 A | * | 11/1994 | Vanderslice et al. | 219/209 |
| 5,508,126 A | * | 4/1996 | Braun | 429/7 |
| 2003/0162084 A1 | * | 8/2003 | Shigeta et al. | 429/62 |
| 2005/0211436 A1 | * | 9/2005 | Fripp et al. | 166/302 |
| 2008/0213652 A1 | * | 9/2008 | Scheucher | 429/62 |
| 2009/0087723 A1 | | 4/2009 | Inda | |
| 2010/0316821 A1 | * | 12/2010 | Chang et al. | 428/35.8 |
| 2011/0077881 A1 | * | 3/2011 | Matsumura et al. | 702/63 |
| 2012/0105010 A1 | * | 5/2012 | Kinoshita | 320/136 |

(Continued)

FOREIGN PATENT DOCUMENTS

JP   04-010366 A   1/1992
JP   6-86240 B2    11/1994

(Continued)

OTHER PUBLICATIONS

International Search Report dated Apr. 24, 2012 in PCT/JP2012/052339, with English translation thereof.

*Primary Examiner* — Suchin Parihar
(74) *Attorney, Agent, or Firm* — McGinn IP Law Group, PLLC.

(57) ABSTRACT

A battery system includes a battery having a battery case and a resistor provided on at least one of surfaces of the battery case, and the resistor is made of a material having specific resistance not more than $10\times10^{-8}$ [$\Omega \cdot$m, 0° C.].

19 Claims, 6 Drawing Sheets

(56) References Cited

U.S. PATENT DOCUMENTS

| | | | |
|---|---|---|---|
| 2012/0107665 A1 | 5/2012 | Abe et al. | |
| 2013/0108896 A1* | 5/2013 | Daniel et al. | 429/50 |
| 2015/0064511 A1* | 3/2015 | Wang et al. | 429/50 |
| 2015/0162576 A1* | 6/2015 | Horie et al. | 429/62 |

FOREIGN PATENT DOCUMENTS

| | | |
|---|---|---|
| JP | 09-017557 A | 1/1997 |
| JP | 2002-260745 A | 9/2002 |
| JP | 2002-291106 A | 10/2002 |
| JP | 2003-234131 A | 8/2003 |
| JP | 2004-063397 A | 2/2004 |
| JP | 2008-021569 A | 1/2008 |
| JP | 2009-87814 A | 4/2009 |
| JP | 2010-067386 A | 3/2010 |
| JP | 2011-014436 A | 1/2011 |
| WO | WO 2011/001691 A1 | 1/2011 |

* cited by examiner

BATTERY SYSTEM

TECHNICAL FIELD

The present invention relates to a battery system.

BACKGROUND ART

Various types of secondary batteries are mounted on mobile objects such as automobiles, ships, and airplanes. Typically known as these secondary batteries are nonaqueous electrolyte secondary batteries such as lithium ion batteries, lead-acid batteries, nickel-cadmium batteries, and the like. Patent Document 1 listed below discloses a battery (secondary battery) mounted on an artificial satellite.

PRIOR ART DOCUMENT

Patent Document

Patent Document 1: JP-B-06-86240

SUMMARY OF THE INVENTION

Problems to be Solved by the Invention

A secondary battery needs to be charged and discharged at low temperature when used on an artificial satellite, an airplane, and the like. The secondary battery has input-output properties deteriorated at low temperature rather than at room temperature. There is accordingly a problem that charging takes longer time in such environment. There is another problem that output voltage is insufficient also during discharging.

In view of these problems, it is an object of the present invention to provide a battery system that is capable of achieving required input-output properties in short time even at low temperature as well as is light in weight.

Means for Solving the Problems

A battery system according to the present invention includes a battery having a battery case and a resistor provided on at least one of surfaces of the battery case, wherein the resistor is made of a material having specific resistance not more than $10 \times 10^{-8}$ [$\Omega \cdot m$, 0° C.].

In this configuration, the resistor is provided on the surface of the battery case. It is thus possible to heat the interior of the battery case by supplying current to this resistor so as to generate Joule heat. It is thus possible to obtain the required input-output properties even at low temperature. Furthermore, when the resistor is made of a material having small specific resistance, the resistor can be reduced in weight in comparison to a conventional heater. This achieves reduction in weight of the entire battery system.

It is possible to use, as the material for the resistor, aluminum, aluminum alloy, copper, copper alloy, nickel, nickel alloy, or brass.

The resistor preferably has a sectional area not less than 0.005 mm²/Ah with respect to capacity of the battery. When the sectional area of the resistor is set to a numerical value satisfying the above condition, fusing of the resistor can be prevented and heat can be generated so as to be suitable for the size of the battery. When the length of the resistor is set to a numerical value satisfying the above condition while the sectional area of the resistor is preferably set to not less than 0.01 m/Ah with respect to the capacity of the battery, the resistor can be provided along the surface of the battery case so as to be fitted to the size of the battery. It is thus possible to efficiently heat the entire battery.

In this battery system, the resistor can be formed on the battery case by depositing a material having specific resistance not more than $10 \times 10^{-8}$ [$\Omega \cdot m$, 0° C.] on the battery case and etching the material, or by patterning a material having specific resistance not more than $10 \times 10^{8}$[$\Omega \cdot m$, 0° C.] and plating the material onto the battery case. When the resistor is formed on the battery case in accordance with one of these manners, the battery case and the resistor are integrated with each other so that the resistor is provided on the surface of the battery case stably for a long period of time.

This battery system can further include a first heat diffusing member located between the battery case and the resistor, and the first heat diffusing member has heat conductivity from 0.2 W/m·K to 10 W/m·K. In this configuration, heat generated at the resistor can be diffused by the first heat diffusing member and conducted to the battery case. The battery case is thus prevented from being heated locally.

This battery system can further include a second heat diffusing member located opposite to the battery case with respect to the resistor. In this configuration, when the temperature of the battery case and the resistor is raised extremely, heat can be radiated efficiently to the side opposite to the battery via the second heat diffusing member. This prevents abnormal excessive heating of the battery and fusing of the resistor.

In this battery system, the battery and the resistor can be set to form a closed circuit so that current discharged from the battery flows to the resistor. In this configuration, it is possible to supply current to the resistor with use of the battery as a power supply so as to heat the interior of the battery case in short time even in the environment where the battery system is not connected to a commercial power supply. The resistor in this battery system has specific resistance smaller than that of a conventional heater. The resistor is thus capable of generating Joule heat enough to heat the battery even with use of electric power of the battery having voltage not more than 5 V.

Advantages of the Invention

According to the present invention, by supplying current to the resistor provided on the surface of the battery case at low temperature, the battery can be heated with use of Joule heat generated from the resistor, thereby achieving the required input-output properties. When the resistor is made of a material having specific resistance smaller than that of a conventional heater, the battery can be heated in short time and the battery system can be reduced in weight.

MODES FOR CARRYING OUT THE INVENTION

A battery system according to an embodiment of the present invention is described with reference to the drawings. It is noted that the following figures are illustrated schematically.

[Equivalent Circuit]

Figure 1:
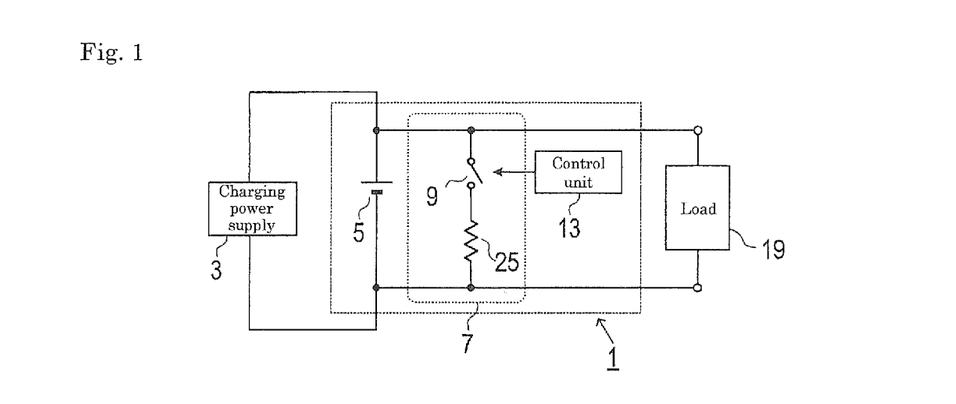
FIG. 1 is a circuit block diagram of a battery system.

FIG. 1 is a circuit block diagram showing an outline of a configuration of the battery system. FIG. 1 illustrates a state where a battery system 1 is electrically connected with a charging power supply 3 and a load 19. The battery system 1 has a secondary battery cell 5 and a shunt circuit 7. The secondary battery cell 5 has a case 21 accommodating an electrode. Hereinafter, the secondary battery cell 5 is simply abbreviated to the "cell 5".

The load 19 is a device that utilizes the battery system 1 as a power supply thereof. The shunt circuit 7 has a switching device 9 and a resistor 25, and is connected to the cell 5 in parallel. The switching device 9 is turned ON and OFF under the control of a control unit 13.

If the cell 5 has voltage lower than a predetermined value, the control unit 13 determines that the cell 5 has not come into a fully charged state, and turns OFF the switching device 9. In this case, current flowing from the charging power supply 3 is supplied to the cell 5 so that the cell 5 is charged. On the other hand, if the cell 5 has voltage not less than the predetermined value, the control unit 13 determines that the cell 5 is in the fully charged state, and turns ON the switching device 9. In this case, current flowing from the charging power supply 3 is bypassed to the shunt circuit 7 and Joule heat is generated at the resistor 25.

Figure 2:
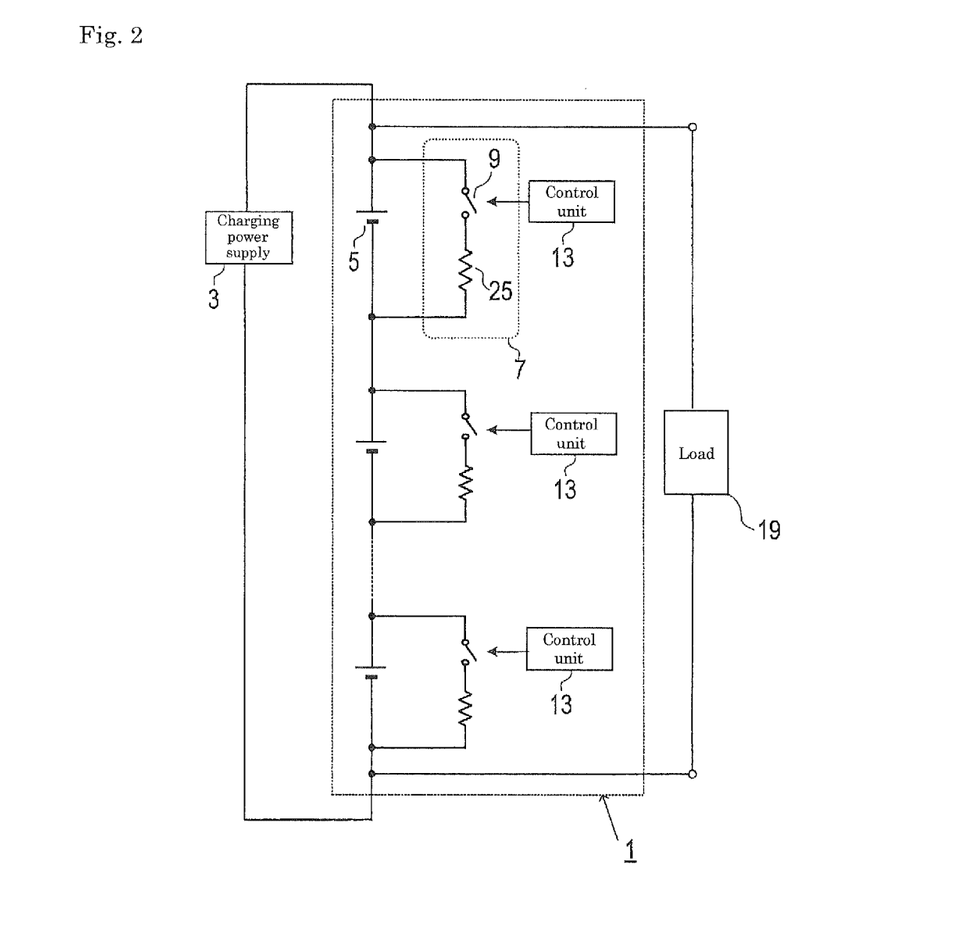
FIG. 2 is another circuit block diagram of the battery system.

FIG. 1 illustrates a case where the battery system 1 is configured by a single cell 5. The battery system 1 can be alternatively configured by a plurality of cells 5 connected in series, as shown in FIG. 2. In this case, a shunt circuit 7 is connected to each of the cells 5 in parallel.

[Overall Configuration]

Figure 3:
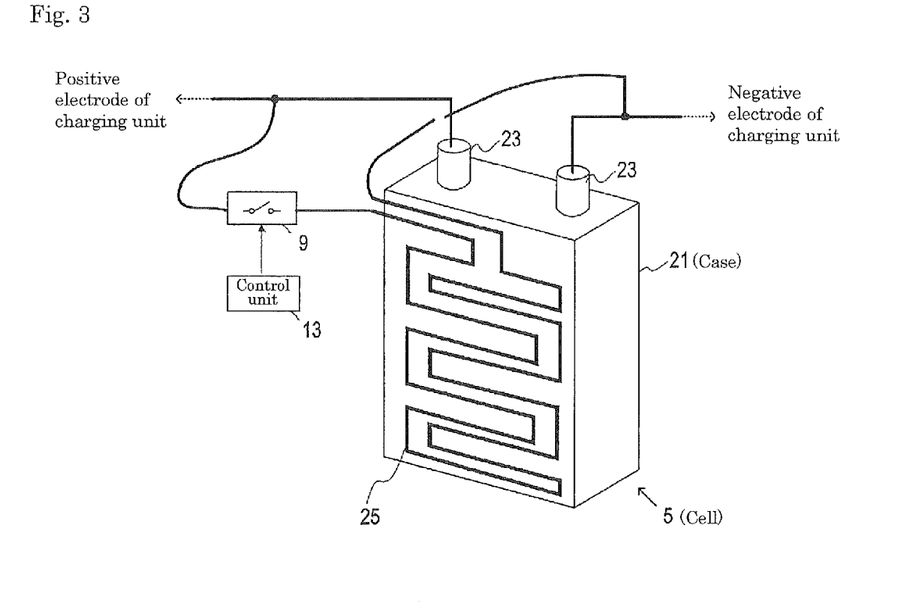
FIG. 3 is a schematic structural diagram of the battery system.

FIG. 3 conceptually illustrates part of the structure of the battery system 1 shown in FIG. 1. In FIG. 3, the configuration is partially illustrated by a block diagram.

The cell 5 has the case 21 accommodating the electrode. The case 21 has a substantially rectangular parallelepiped shape and is made of metal such as stainless steel or aluminum. The case 21 has an upper surface that is provided at two portions (positive and negative electrode portions) with electrode terminals 23.

A node connecting the charging power supply 3 and one of the electrode terminals 23 is also connected to a first end of the switching device 9. The switching device 9 has a second end connected to the resistor 25. Examples of the switching device 9 include transistor devices such as a MOSFET and a bipolar transistor.

When the switching device 9 provided on a surface of the case 21 is turned ON, current flows to the resistor 25 and Joule heat is generated at the resistor 25. Such Joule heat is used to heat the electrode in the case 21. In other words, the resistor 25 functions as a heater for heating the electrode.

[Material for Resistor]

The resistor 25 is utilized to heat the electrode in the case 21. The resistor 25 is thus designed to generate Joule heat (several tens to several hundreds of watts) enough to raise temperature of the electrode.

The material for the resistor 25 has specific resistance quite different from that of an ordinary heater. Commercial voltage (100 to 200 V) is constantly applied to an ordinary heater. In order to prevent disconnection of the heater due to such large applied voltage, the material for the heater is selected so that current as small as possible flows. An ordinary heater is thus made of a material having relatively large specific resistance, such as stainless steel or nickel-chromium alloy.

In contrast, voltage lower than the commercial voltage is expected to be applied to the battery system 1, like charge voltage (at most 5 V) of the cell 5. Large current of a certain degree thus needs to flow to the resistor 25 in order to generate heat enough to heat the interior of the case 21. The resistor 25 accordingly needs to be made of a material having small specific resistance.

The material for the resistor 25 has specific resistance not more than $10 \times 10^{-8}$ [$\Omega \cdot m$, 0° C.], and more preferably not more than $5 \times 10^{-8}$ [$\Omega \cdot m$, 0° C.]. On the other hand, too small specific resistance causes an excessive flow of current, which may lead to disconnection of the resistor 25 or excessive heating of the electrode. The specific resistance is thus preferably set to be not less than $1 \times 10^{-8}$ [$\Omega \cdot m$, 0° C.].

The resistor 25 according to the present embodiment is made of aluminum. The resistor 25 made of aluminum is light in weight, thereby achieving reduction in weight of the battery system 1. It is possible to use, as the material for the resistor 25 other than aluminum, aluminum alloy, copper, copper alloy, nickel, nickel alloy, brass, or the like.

[Size of Resistor]

The resistor 25 in the battery system 1 preferably has a sectional area not less than 0.005 mm$^2$/Ah with respect to the battery capacity of the cell 5. In this case, the electrode in the case 21 can be heated in short time in accordance with the battery capacity.

The sectional area is determined by width and thickness. The "thickness" of the resistor 25 corresponds to the size perpendicular to the surface of the case 21 on which the resistor 25 is provided. The "width" of the resistor 25 corresponds to the size parallel to the surface of the case 21 on which the resistor 25 is provided and perpendicular to the longitudinal direction. The size of the resistor 25 in the longitudinal direction is referred to as "length" of the resistor 25. The battery capacity varies from a 0% charged state to a 100% charged state, and corresponds to the discharge capacity in a case where electricity is discharged from the 100% charged state to the 0% charged state.

If large current flows to the resistor 25 having quite a small sectional area, the resistor 25 may be easily disconnected. The resistor 25 preferably has thickness not less than 0.005 mm and width not less than 1 mm. The resistor 25 more preferably has thickness not less than 0.1 mm in order to sufficiently radiate heat to the case 21.

On the other hand, excessive increase in sectional area leads to increase in weight of the resistor 25. The sectional area of the resistor 25 is preferably not more than 10 mm$^2$/Ah and more preferably not more than 5 mm$^2$/Ah with respect to the battery capacity. The resistor 25 preferably has thickness not more than 1.0 mm and width not more than 20 mm.

If the resistor 25 is too small in length, the resistor 25 is provided at a local portion on the surface of the case 21. In this case, only the local portion on the surface of the case 21 is excessively heated, and heat is not uniformly conducted to the electrode in the case 21.

The resistor 25 is preferably configured by conductive wire, and the length of the resistor 25 is preferably not less than 0.01 m/Ah with respect to the battery capacity. The resistor 25 configured by conductive wire can be freely designed in shape. Furthermore, the resistor 25 of not less than 0.01 m/Ah in length can be provided uniformly on the surface of the case 21.

When the resistor 25 is provided on one of the surfaces of the case 21, the area provided with the resistor 25 (the area where the resistor 25 and one of the surfaces of the case 21 are in contact with each other) preferably occupies 20% to 80% of the area of the surface of the case 21. If the area provided with the resistor 25 occupies more than 80% thereof, the resistor 25 may be provided to a portion where Joule heat is not conducted to the electrode in the case 21. The temperature of the resistor 25 tends not to spread in the portion where Joule heat is not conducted to the electrode, and thus the temperature of the resistor 25 is remarkably increased and the resistor 25 may be fused.

When the resistor 25 is made of aluminum and is 2 mm long, 0.1 mm thick, and 1 cm wide, the resistor 25 will have a resistance value R calculated as R=0.05Ω. In this case, aluminum is assumed to have specific resistance of $2.5 \times 10^{-8}$ [Ω·m, 0° C.]. If influence of other resistance is ignored and applied voltage is set to 3.5 V (the charge voltage of the cell 5), current of 70 A flows to the resistor 25 and consumed electric power is equal to 245 W.

If compared under the condition of same sizes, Joule heat of the resistor 25 is dependent on the specific resistance of the material for the resistor 25. For example, if the resistor 25 is configured by nichrome wire that is a material for an ordinary heater, the nichrome wire has specific resistance exceeding $100 \times 10^{-8}$ [Ω·m, 0° C.], and the resistance value R of the resistor 25 is 20Ω. In this case, current as small as 87.5 mA flows to the resistor 25, and consumed electric power is also as low as about 0.15 W. It is impossible to heat the electrode in the case 21 in this state.

The resistor 25 needs to be reduced in length or increased in sectional area in order to obtain equivalent Joule heat with use of nichrome wire. It is, however, difficult to conduct Joule heat uniformly to the electrode in the case 21 when the resistor 25 is shorter in length. Furthermore, the resistor 25 having a larger sectional area remarkably increases the weight of the battery system.

[Formation of Resistor]

Figure 4:
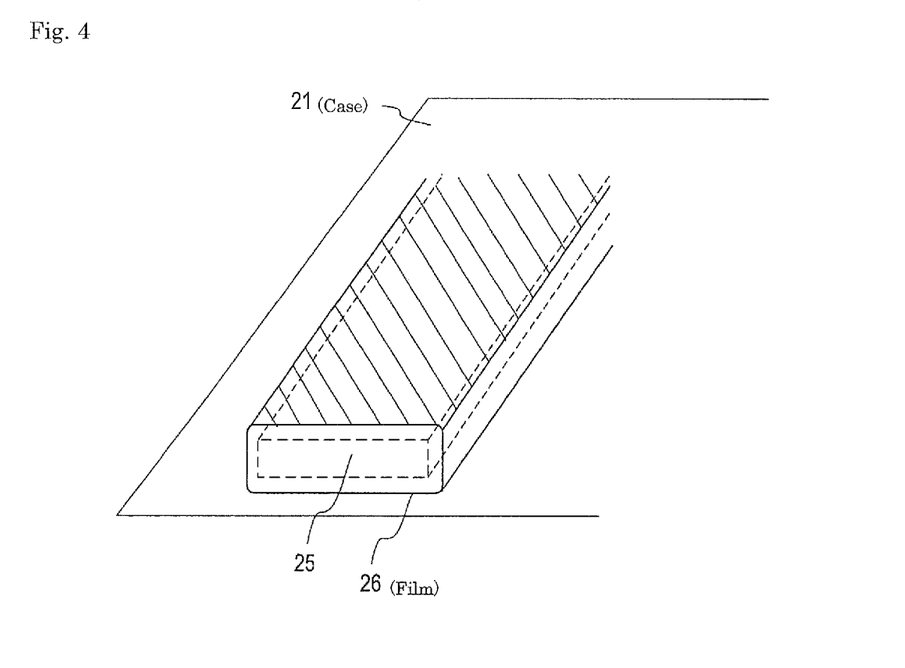
FIG. 4 is a schematic structural diagram of an enlarged side surface of a case of a secondary battery.

FIG. 4 schematically illustrates, on a larger scale, a state where the resistor 25 is provided on a side surface of the case 21. There is a manner of forming the resistor 25 on a surface of the case 21, in which the resistor 25 and the case 21 are integrated with each other. As shown in FIG. 4, the resistor 25 is covered with a film 26. The film 26 can be formed as an oxide film by anodic oxidation coating or can be made of an insulating material such as polyimide.

Figure 5:
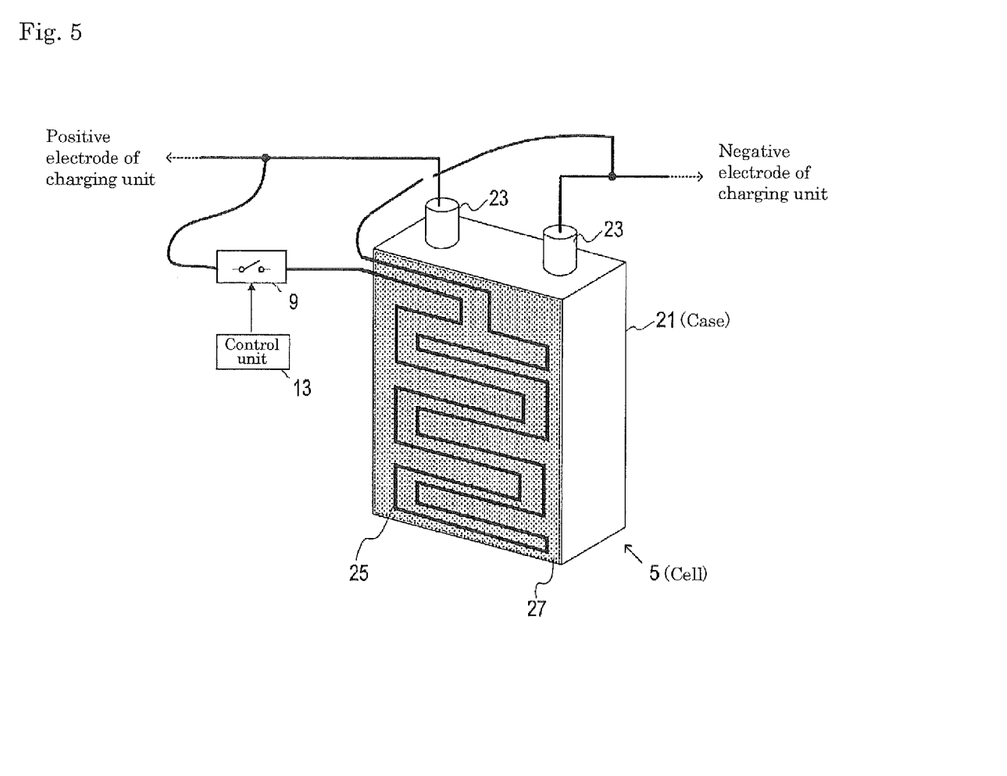
FIG. 5 is another schematic structural diagram of the battery system.
Figure 6:
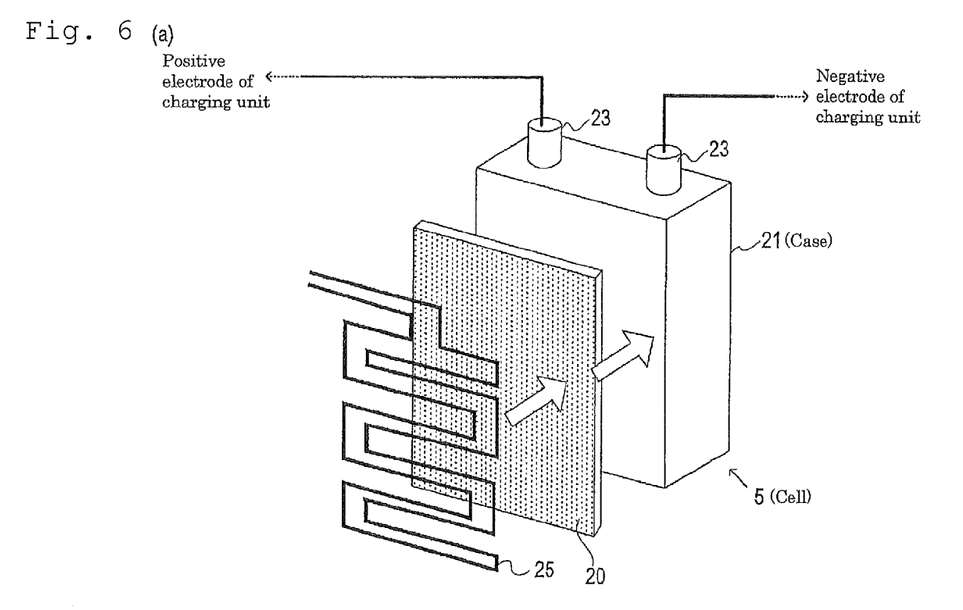
FIGS. 6(a) and 6(b) are another schematic structural diagrams of the battery system.

As shown in FIG. 5, there is a manner of integrating the resistor 25 with the case 21, in which a surface of the case 21 is preliminarily provided with insulating paint 27 and an aluminum material is directly deposited on this surface. In this case, the deposited aluminum material is then patterned through etching or the like into a desired shape so as to form the resistor 25. It is possible to use, as the paint 27, resin paint such as polyimide, ceramic paint, or the like.

There is a different manner of integrating the resistor 25 with the case 21, in which a metal material preliminarily patterned into a predetermined shape is plated or bonded to the surface of the case 21 provided with the paint 27. Bonding in this case indicates the process of integrating the resistor 25 with the case 21 through chemical reaction. In view of strength of adhesion with the metal material and heat resistance, the metal material is preferably bonded by means of a silicone adhesive agent, an epoxy adhesive agent, or polyimide adhesive agent.

In addition to the manner of integrating the resistor 25 with the case 21, there is another manner in which the resistor 25 is pasted to the case 21 by means of a tackifier. In the case there the resistor 25 is pasted to the surface of the case 21 by means of a tackifier, the resistor 25 may not be retained on the surface of the case 21 for a long period of time. It is because the tackifier is reduced in sticking strength in the course of time or the case 21 is expanded to be deformed. As a result, the resistor 25 may be partially detached from or peeled off the surface of the case 21. In view of the above, the resistor 25 and the case 21 are preferably integrated with each other.

[Structure of Heat Diffusing Member]

In the present embodiment, there can be provided a heat diffusing member 20 between the surface of the case 21 and the resistor 25. The heat diffusing member 20 corresponds to a "first heat diffusing member".

The heat diffusing member 20 is provided in order to diffuse Joule heat generated at the resistor 25 on the surface of the case 21 so as to be conducted along the surface. The heat diffusing member 20 has heat conductivity preferably from 0.2 W/m·K to 10 W/m·K, and more preferably from 1.0 W/m·K to 5.0 W/m·K.

If the heat conductivity of the heat diffusing member 20 is larger than 10 W/m·K, Joule heat generated at the resistor 25 is conducted to the case 21 with no remarkable diffusion by the heat diffusing member 20. In this case, Joule heat cannot be diffused along the surface of the case 21. In contrast, if the heat conductivity of the heat diffusing member 20 is smaller than 0.2 W/m·K, Joule heat generated at the resistor 25 is blocked by the heat diffusing member 20 and is not sufficiently conducted to the case 21. In this case, the object of heating the electrode in the case 21 cannot be achieved.

In view of these conditions of heat conductivity, it is possible to use, as the material for the heat diffusing member 20, polyethylene, isobutylene-isoprene rubber, a resin material such as silicone resin, a composite material, a laminate material, or the like. The composite material is obtained by dispersing, in resin, an appropriate amount of powders, fibers, or foil pieces of silicon oxide, graphite, aluminum, magnesium, copper, silver, titanium, or the like. The laminate material includes a plurality of stacked polyethylene sheets, silicone resin sheets, aluminum foil, stainless steel foil, polyester sheets, nylon sheets, or the like.

The sheets made of the above material are stuck or bonded to the surface of the case 21, so that the heat diffusing member 20 can be formed easily. The heat diffusing member 20 is preferably made of an insulating material. Such an insulating material prevents a short circuit between the case 21 and the resistor 25.

The heat diffusing member 20 has thickness preferably from 0.05 mm to 3 mm, and more preferably from 0.1 mm to 2 mm. The heat diffusing member 20 thinner than 0.05 mm may reduce the diffusion area, whereas the heat diffusing member 20 thicker than 3 mm may not achieve sufficient conduction of Joule heat.

[Structure Having Radiation Function]

The case 21 can usefully have a radiation function in addition to the configuration described above. If current continuously flows to the resistor 25 because of some abnormality, the electrode in the case 21 will be heated continuously. If the electrode is heated excessively, the cell 5 is adversely affected in terms of safety.

Figure 7:
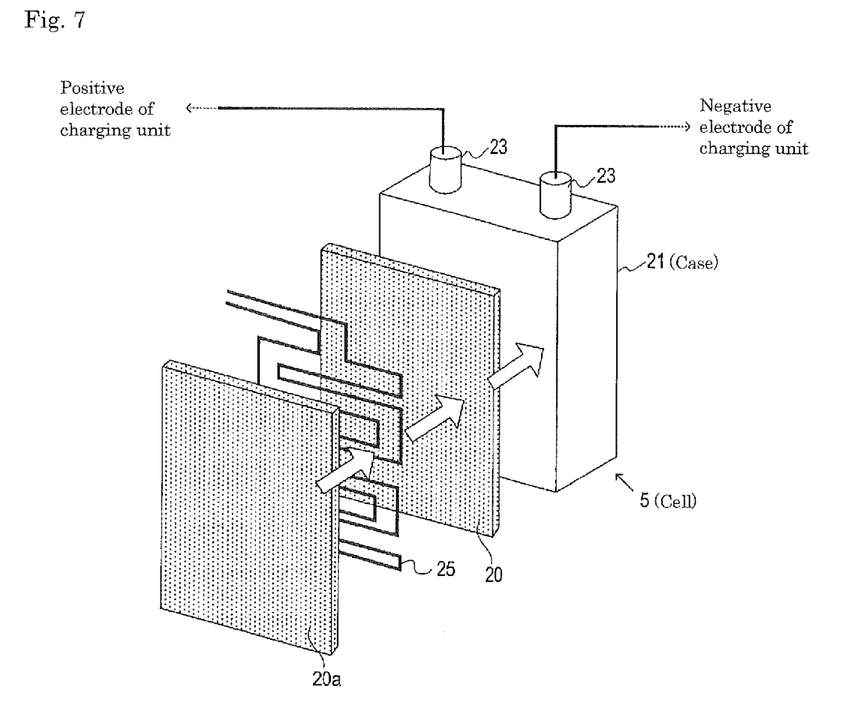
FIG. 7 is another schematic structural diagram of the battery system.

In the schematic diagram shown in FIG. 7 the resistor 25 is nipped between two heat diffusing members 20 and 20a on the surface of the case 21. The heat diffusing member 20a corresponds to a "second heat diffusing member". In the configuration shown in FIG. 7, Joule heat generated from the resistor 25 is discharged to outside air via the heat diffusing member 20a. On the other hand, similarly to the above embodiment, Joule heat generated from the resistor 25 is conducted into the case 21 via the heat diffusing member 20 so as to heat the electrode in the case 21.

In a state where the case 21 is cold, heat tends not to be conducted even if current is supplied to the resistor 25 so as to generate Joule heat. Heat is thus diffused to the heat diffusing members 20 and 20a, and the heat is then partially radiated to outside air via the heat diffusing member 20a whereas most of the heat is conducted into the case 21 via the heat diffusing member 20.

In a state where the interior of the case 21 is heated sufficiently, there is a large difference in temperature between inside and outside the heat diffusing member 20a. Heat thus is conducted largely between the outer side surface of the heat diffusing member 20a and outside air, and heat of the resistor 25 and the case 21 is radiated quickly.

In other words, even though the heat diffusing member 20a is provided, heat generated at the resistor 25 is radiated to outside at a relatively low rate when the interior of the case 21 is cold. In contrast, when the interior of the case 21 is heated, heat of the resistor 25 and the case 21 can be radiated to outside air by the heat diffusing member 20a being provided.

Figure 8:
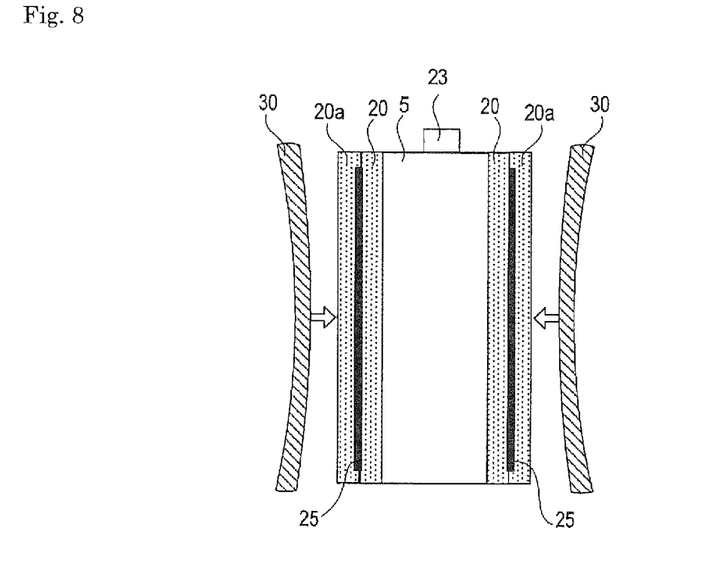
FIG. 8 is another schematic structural diagram of the battery system.

As shown in FIG. 8, there can be further provided a pressing plate 30 pressing the heat diffusing member 20a from outside toward the case 21. The pressing plate 30 is preferably made of a material that is light in weight and has high heat conductivity, such as aluminum, magnesium, titanium, or alloy thereof.

Figure 9:
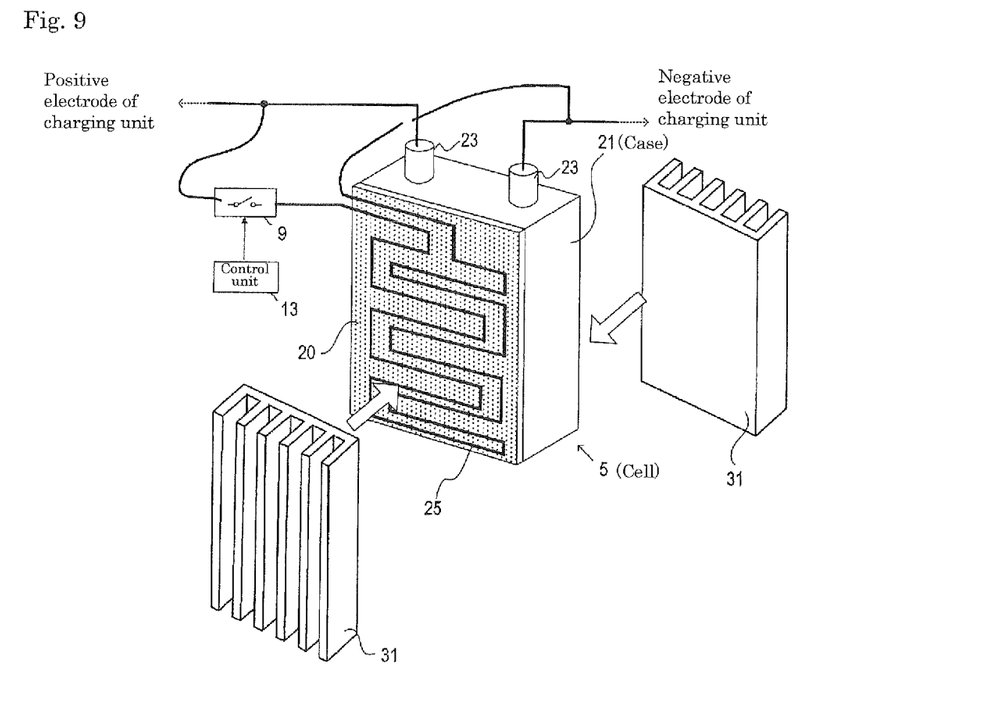
FIG. 9 is another schematic structural diagram of the battery system.

As shown in FIG. 9, in order to achieve an effect similar to that of the heat diffusing member 20a, the heat diffusing member 20 can be provided outside thereof with a radiator (heat sink) 31. The radiator 31 is preferably made of a material that is light in weight and has high heat conductivity, such as aluminum, magnesium, titanium, or alloy thereof.

[Outline of Operation]

Described below is an outline of operation of the battery system 1. As described earlier, the switching device 9 is turned ON and OFF under the control of the control unit 13. When the switching device 9 is turned ON, current flows to the resistor 25 and Joule heat is generated at the resistor 25. The resistor 25 is provided on the surface of the case 21, and Joule heat generated at the resistor 25 is conducted to the electrode in the case 21.

As mentioned earlier in the section of the problems, there arises the problem that the input property and the output property of the cell 5 deteriorate at low temperature. This problem is remarkable in a case where the cell 5 is applied to an airplane or the like. A battery mounted on an airplane is mainly utilized for starting an engine thereof. The cell 5 is discharged upon starting the engine to take off, so that the cell 5 needs to be charged in the sky at low temperature.

The input property deteriorates at low temperature in the sky, for example. In the battery system 1, when the switching device 9 is turned ON, current flowing from the charging power supply 3 is entirely or partially supplied to the resistor 25 so as to generate Joule heat, thereby successfully increasing the temperature of the cell 5. It is accordingly possible to prevent deterioration in input property.

In the case where the battery system 1 is utilized as the power supply of the load 19, there is required an output property of a certain degree. Nevertheless, output voltage deteriorates remarkably at low temperature, thereby failing to obtain a sufficient output property. In contrast, it is possible to obtain a required output property by supplying current to the resistor 25 so as to increase the temperature of the cell 5.

In the battery system 1, Joule heat generated at the resistor 25 by supplying current to the shunt circuit 7 can be utilized for heating the cell 5. It is thus possible to obtain sufficient input-output properties of the battery even at low temperature.

This outline exemplifies the operation of supplying current from the charging power supply 3 to the resistor 25 and generating Joule heat so as to heat the electrode in the cell 5. It is also possible to supply current to the resistor 25 with use of electric power stored in the cell 5. In other words, the battery system 1 can be configured to heat the cell 5 with use of own electric power of the cell 5.

In a state where the charging power supply 3 is not in operation, in FIGS. 1 and 3, the cell 5 and the resistor 25 can be made to form a closed circuit so as to supply current to the resistor 25 with use of electric power stored in the cell 5. The cell 5 has voltage not more than 5 V, which is lower than the commercial voltage (100 to 200V). It is thus impossible to generate sufficient Joule heat if the resistor 25 is made of a material for an ordinary heater. On the other hand, in the battery system 1 according to the present invention, the resistor 25 has specific resistance not more than $10 \times 10^{-8}$ [$\Omega \cdot m$, 0° C.]. It is thus possible to supply large amount of current to the resistor 25 and generate Joule heat enough to heat the cell 5.

In a mobile object such as an airplane, a dynamo (the charging power supply 3) typically starts operation after an engine starts. In most cases, it is impossible to supply current from the charging power supply 3 to the resistor 25 before starting the engine. In this condition, prior to starting the engine, the cell 5 and the resistor 25 can be made to form a closed circuit so as to supply current to the resistor 25 with use of electric power of the cell 5 and heat the cell 5. When the cell 5 is heated, it is possible to obtain the output property necessary for starting the engine.

This technique is preferably applied to a nonaqueous electrolyte secondary battery such as a lithium ion battery, but not limited to a battery of this type. This technique is also applicable to a lead-acid battery, a nickel-cadmium battery, and the like.

Other Embodiments

Described below are other embodiments.

<1> When the resistor 25 is made of thin aluminum foil or copper foil, the resistor 25 can be configured by clad metal (clad metal of aluminum and nickel or clad metal of copper and nickel) in order to increase the strength of the foil.

The specific resistance of copper is about a half of that of aluminum. In comparison to a resistor 25 made of aluminum, a resistor 25 made of copper having half volume can generate equal Joule heat. When copper is used as the material for the resistor 25, the production cost can be reduced in comparison to the case of using aluminum. It is also extremely easy to plate to the side surface of the case 21.

<2> The control unit 13 can include means for detecting temperature of the case 21 and control to turn ON and OFF the switching device 9 depending on the temperature. In this case, after the switching device 9 is turned ON, the control unit 13 controls to turn OFF the switching device 9 when the temperature of the case 21 reaches a predetermined level. The cell 5 can be charged in the state where the electrode has high temperature. It is thus possible to improve the input property thereafter.

Figure 10:
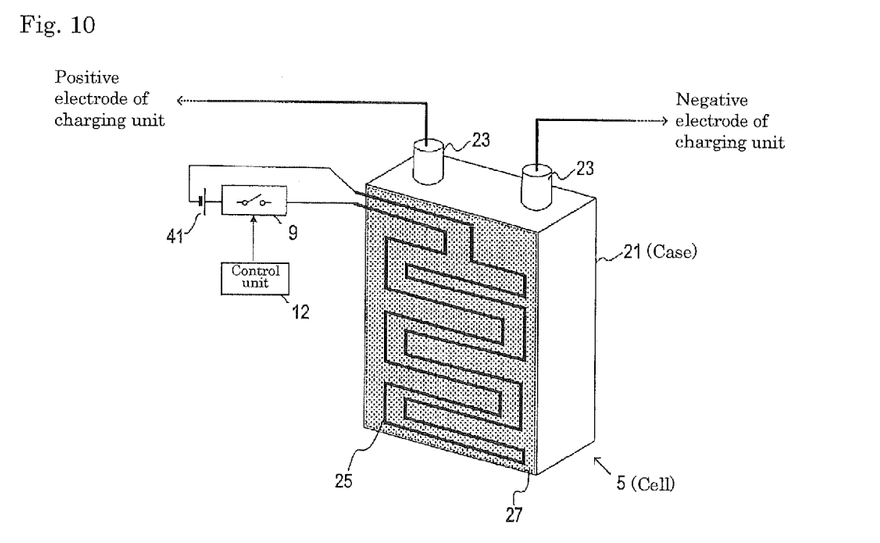
FIG. 10 is a schematic structural diagram of a battery system according to another embodiment.

<3> According to the above embodiment, the resistor 25 configures the shunt circuit 7. Alternatively, the resistor 25 can be provided only for heating the cell 5, without functioning as the shunt circuit 7. For example, as shown in FIG. 10, there can be separately provided a power supply 41 for supplying current to the resistor 25.

EXAMPLES

First Example

Described below are differences in effect due to variation in material and size of the resistor 25. There were used a battery having battery capacity of 20 Ah (size of side surface: 8 cm×12 cm) and a battery having battery capacity of 50 Ah (size of side surface: 10 cm×15 cm). Applied voltage was set to 3.5 V, and a resistor 25 was pasted to only one of the side surfaces of each battery.

The temperature of the case 21 was set to −20° C. before heating. If this temperature was raised to 0° C. within ten minutes, it is to be regarded as successfully obtaining necessary input-output properties in short time. In other words, it will be determined that the effect is recognized if the temperature of the case 21 is raised by at least 20° C. by applying the voltage for ten minutes. Table 1 indicates results of the respective secondary batteries.

the resistor more preferably has a sectional area not less than 0.005 mm$^2$/Ah, as in examples 1 to 5.

In comparative examples 1 and 2, when the resistor is made of Sn, the temperature was raised only by less than 20° C. in ten minutes even with the sectional area not less than 0.005 mm$^2$/Ah. It is noted that Sn has specific resistance equal to 11.5×10$^{-8}$ [Ω·m, 0° C.].

It is accordingly recognized that the resistor 25 is preferably made of a material having specific resistance from 1×10$^{-8}$ [Ω·m, 0° C.] to 10×10$^{-8}$ [Ω·m, 0° C.]. It is also recognized that the resistor 25 more preferably has a sectional area not less than 0.005 mm$^2$/Ah with respect to its battery capacity. The secondary battery was effectively heated in short time by providing the resistor 25 satisfying these conditions.

Second Example

Described next are differences in effect due to variation in material and thickness of the heat diffusing member.

The heat diffusing member was pasted to two larger side surfaces of each battery having a rectangular parallelepiped shape and battery capacity equal to 50 Ah, and the resistor was pasted to the surface of the heat diffusing member. The batteries are each sized to have the larger side surfaces of 10 cm×15 cm and smaller side surfaces of 10 cm×4 cm. The resistor was made of copper, and had 0.05 mm in thickness, 10 mm in width, and 1 m in length. In this state, surface

TABLE 1

|  | Width [mm] | Thickness [mm] | Sectional area [mm$^2$] | Length [m] | Material | Battery capacity [Ah] | Sectional area/ Battery capacity [mm$^2$/Ah] | Result |
| --- | --- | --- | --- | --- | --- | --- | --- | --- |
| Example 1 | 5 | 0.05 | 0.25 | 1.5 | Al | 20 | 0.0125 | Raised by 21° C. in 10 minutes |
| Example 2 | 2 | 0.05 | 0.1 | 1.5 | Cu | 20 | 0.005 | Raised by 22° C. in 10 minutes |
| Example 3 | 5 | 0.1 | 0.5 | 1.5 | Al | 20 | 0.025 | Raised by 23° C. in 5 minutes |
| Example 4 | 6 | 0.1 | 0.6 | 1.5 | Al | 50 | 0.012 | Raised by 21° C. in 10 minutes |
| Example 5 | 8 | 0.1 | 0.8 | 1.5 | Al | 50 | 0.016 | Raised by 29° C. in 10 minutes |
| Example 6 | 2 | 0.03 | 0.06 | 1.5 | Al | 20 | 0.003 | Raised by 5° C. in 10 minutes |
| Example 7 | 3 | 0.05 | 0.15 | 1.5 | Al | 50 | 0.003 | Raised by 4° C. in 10 minutes |
| Example 8 | 2 | 0.04 | 0.08 | 1.5 | Cu | 20 | 0.004 | Raised by 16° C. in 10 minutes |
| Comparative Example 1 | 5 | 0.1 | 0.5 | 1.5 | Sn | 20 | 0.025 | Raised by 13° C. in 10 minutes |
| Comparative Example 2 | 2 | 0.03 | 0.06 | 1.5 | Sn | 20 | 0.003 | Raised by 2° C. in 10 minutes |

In examples 1 to 5, when the resistor made of Al or Cu is formed to have a sectional area not less than 0.005 mm$^2$/Ah with respect to its battery capacity, the temperature is raised by at least 20° C. in ten minutes. It is noted that Al and Cu are materials having specific resistance from 1×10$^{-8}$ [Ω·m, 0° C.] to 10×10$^{-8}$ [Ω·m, 0° C.].

The temperature is raised also in examples 6 to 8. In a case where the resistor has a sectional area less than 0.005 mm$^2$/Ah with respect to the battery capacity, the temperature was raised by less than 20° C. in ten minutes. It is recognized that temperature of the case was set to −20° C. before heating. Temperature (T1) of the electrode located immediate below the resistor and surface temperature (T2) of the case were measured after applying voltage of 3.5 V to the resistor for five minutes. Surface temperature was measured in each of examples and comparative examples in which the heat diffusing member was varied in terms of material (in other words, heat conductivity) and thickness, with other conditions being set equally. The surface temperature (T2) of the battery case was measured at the center of one of the smaller side surfaces. Table 2 indicates results of the respective secondary batteries.

TABLE 2

|  | Heat conductivity [W/m·K] | Thickness [mm] | Material | T1 | T2 |
|---|---|---|---|---|---|
| Example 9 | 0.2 | 0.5 | Polyethylene (0.27 mm) Silicone resin (0.2 mm) | 12° C. | 2° C. |
| Example 10 | 1.5 | 0.5 | Silicone resin | 28° C. | 5° C. |
| Example 11 | 1.5 | 2.0 | Silicone resin | 15° C. | 3° C. |
| Example 12 | 10 | 0.5 | Composite of silicone resin and alumina (aluminum oxide) | 47° C. | 8° C. |
| Example 13 | 10 | 2.0 | Composite of silicone resin and alumina (aluminum oxide) | 25° C. | 5° C. |
| Example 14 | 0.1 | 0.5 | EPDM sponge | −18° C. | −19° C. (*1) |
| Example 15 | 30 | 0.5 | Composite of carbon fiber and silicone resin | 88° C. | 10° C. |
| Example 16 | 55 | 0.5 | Iron-nickel alloy | 135° C. | 12° C. |

(*1) Disconnected due to heat generated at resistor soon after energization

It is recognized from Table 2 that the surface temperature (T1) of the electrode located immediately below the resistor is remarkably raised in each of examples 15 and 16 in which the heat diffusing member is made of a material having high heat conductivity. This suggests that the heat diffusing member according to each of examples 15 and 16 fails to sufficiently exert the function of diffusing heat generated at the resistor.

In example 14 in which the heat diffusing member has heat conductivity as low as 0.1 [W/m·K], the resistor was disconnected soon after energization due to generated heat. This phenomenon is considered such that heat generated at the resistor was not diffused via the heat diffusing member due to quite low heat conductivity and the temperature of the resistor was raised remarkably to result in disconnection.

In contrast, when the heat diffusing member has heat conductivity from 0.2 [W/m·K] to 10 [W/m·K] as in examples 9 to 13, remarkable increase of the surface temperature (T1) of the electrode immediately below the resistor was suppressed effectively. Furthermore, in these examples, the difference between the surface temperature (T2) of the electrode and the surface temperature (T1) of the battery case can be made not to exceed 50° C. This suggests that heat generated at the resistor is efficiently diffused to the entire battery case. It is thus recognized that the heat diffusing member more preferably has heat conductivity from 0.2 [W/m·K] to 10 [W/m·K].

DESCRIPTION OF REFERENCE SIGNS

1: Battery system
3: Charging power supply
5: Cell
7: Shunt circuit
9: Switching device
12: Control unit
13: Control unit
19: Load
20: Heat diffusing member
20a: Heat diffusing member
21: Case
23: Electrode terminal
25: Resistor
26: Film
27: Paint
30: Pressing plate
31: Radiator
41: Power supply

The invention claimed is:

1. A battery system, comprising:
a battery cell comprising case, the case accommodating an electrode and having an outer flat surface;
a resistor provided at least on an outer flat surface of the case, wherein the resistor comprises a material having a specific resistance not more than $10 \times 10^{-8}$ [Ω·m, 0° C.]; and
a first heat diffusing member provided on at least one of the outer flat surface of the case and another surface of the case,
wherein the resistor is provided on a surface of the first heat diffusing member,
wherein the first heat diffusing member has a heat conductivity from 0.2 W/m·K to 10 W/m·K, and
wherein the first heat diffusing member is sheet-shaped.

2. The battery system according to claim 1, wherein the material for the resistor comprises aluminum, an aluminum alloy, copper, a copper alloy, nickel, a nickel alloy, or brass.

3. The battery system according to claim 1, wherein the resistor has a sectional area not less than 0.012 mm$^2$/Ah with respect to a capacity of the battery.

4. The battery system according to claim 1, wherein the resistor and the case are integrated with each other, and
wherein the resistor is formed on the case by depositing the material having the specific resistance of not more than $10 \times 10^{-8}$ [Ω·m, 0° C.] and etching the material, or by patterning the material having the specific resistance not more than $10 \times 10^{-8}$ [Ω·m, 0° C.] and plating the material onto the case.

5. The battery system according to claim 1, further comprising:
a second heat diffusing member,
wherein the resistor is nipped between the second heat diffusing member and the case.

6. The battery system according to claim 1, wherein the battery and the resistor are set to form a closed circuit so that current discharged from the battery flows to the resistor.

7. The battery system according to claim 1, wherein the resistor occupies equal to or more than 20% of an area of the outer flat surface of the case.

8. The battery system according to claim 1, wherein the resistor is provided on a largest surface of the case.

9. The battery system according to claim 1, further comprising:
a shunt circuit comprising a switching device and the resistor,
wherein the shunt circuit is connected to the battery in parallel.

10. The battery system according to claim 1, wherein the resistor is attached to the case by a tackifier.

11. The battery system according to claim 1, wherein the case comprises a metal.

12. The battery system according to claim 1, further comprising:
a radiator,
wherein the resistor is nipped between the first heat diffusing member and the radiator.

13. The battery system according to claim 1, further comprising:
a pressing plate pressing the first heat diffusing member from outside toward the case.

14. The battery system according to claim 1, wherein the battery system includes one or more of the battery cell,
wherein each of said one or more of the battery cell comprises the resistor.

15. The battery system according to claim 14, wherein said each of said one or more of the battery cell includes two terminals, and
wherein the resistor is provided separately on said each of said one or more of the battery cell such that the two terminals of said each of said one or more of the battery cell are connected to a corresponding resistor provided separately on said each of said one or more of the battery cell.

16. A battery system, comprising:
a plurality of battery cells each comprising a case accommodating an electrode and having an outer surface; and
a plurality of resistors each provided at least on an outer surface of a corresponding case of said each battery cells, wherein said each resistor comprises a material having a specific resistance not more than $10 \times 10^{-8}$ [$\Omega \cdot m$, 0° C.]; and
a heat diffusing member provided on at least one of the outer flat surface of the corresponding case and another surface of the corresponding case,
wherein said each of the resistors is provided on a surface of the heat diffusing member,
wherein the heat diffusing member has a heat conductivity from 0.2 W/m·K to 10 W/m·K, and
wherein the heat diffusing member is sheet-shaped.

17. The battery system according to claim 16, wherein said each of the battery cells includes two terminals, and
wherein said each of the resistors is provided separately on said each of the battery cells such that the two terminals of said each of the battery cells are connected to said each of the resistors provided separately on said each of the battery cells.

18. The battery system according to claim 17, wherein the outer surface of the case is flat.

19. The battery system according to claim 16, wherein said each of the resistors occupies equal to or more than 20% of an area of the outer surface of the corresponding case of said each battery cell, and
wherein said each of the resistors is disposed on a largest surface of the corresponding case of said each battery cell.

* * * * *